United States Patent
Surinder

(10) Patent No.: US 10,267,922 B2
(45) Date of Patent: Apr. 23, 2019

(54) MULTIPATH MITIGATION IN POSITIONING SYSTEMS

(75) Inventor: Thind Surinder, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 746 days.

(21) Appl. No.: 14/342,068

(22) PCT Filed: Aug. 31, 2012

(86) PCT No.: PCT/KR2012/007009
§ 371 (c)(1),
(2), (4) Date: Apr. 21, 2016

(87) PCT Pub. No.: WO2013/032285
PCT Pub. Date: Mar. 7, 2013

(65) Prior Publication Data
US 2016/0252620 A1    Sep. 1, 2016

(30) Foreign Application Priority Data

Aug. 31, 2011    (GB) .................................. 1115015.8

(51) Int. Cl.
*G01S 19/22*    (2010.01)
*G01S 19/24*    (2010.01)

(52) U.S. Cl.
CPC .............. *G01S 19/22* (2013.01); *G01S 19/24* (2013.01)

(58) Field of Classification Search
CPC .......... G01S 19/22; G01S 19/24; G01S 19/30; G01S 19/29; G01S 19/34; G01S 19/37

(Continued)

(56) References Cited

U.S. PATENT DOCUMENTS 6,421,000 B1    7/2002    McDowell
7,072,669 B1    7/2006    Duckworth
(Continued)

FOREIGN PATENT DOCUMENTS

EP    1 404 033 A2    3/2004
EP    1 553 424 A1    7/2005
(Continued)

*Primary Examiner* — Harry K Liu
(74) *Attorney, Agent, or Firm* — Jefferson IP Law, LLP

(57) ABSTRACT

An apparatus for receiving positioning signals comprises an antenna configured to output a plurality of antenna signals and a multipath compensation module for detecting multipath interference, and if multipath interference is detected, selecting one or more of the antenna signals and combining the selected one or more antenna signals to obtain a compensated signal. The antenna is arranged to distinguish between ones of the positioning signals received at different incident angles, and each antenna signal includes ones of the positioning signals received in a predetermined range of incident angles. The multipath compensation module may determine whether multipath interference is present in each antenna signal, and may not select any antenna signals which include interference when selecting the antenna signals to be combined. The gain of each antenna signal may be adjusted before the signals are combined, to maintain the noise power of each antenna signal below a predetermined limit. The phase of each antenna signal may be adjusted before the signals are combined, to reduce phase differences between the antenna signals.

24 Claims, 4 Drawing Sheets

(58) Field of Classification Search
USPC .................................................. 342/357.61
See application file for complete search history.

(56) References Cited

U.S. PATENT DOCUMENTS

| | | |
|---|---|---|
| 2002/0101912 A1 | 8/2002 | Phelts et al. |
| 2003/0054845 A1 | 3/2003 | Kransy et al. |
| 2003/0115007 A1* | 6/2003 | Lipp .................... G01S 7/2813 |
| | | 702/94 |
| 2005/0088337 A1 | 4/2005 | Lorenz |
| 2007/0058700 A1 | 3/2007 | Fenton |
| 2010/0098136 A1 | 4/2010 | Abraham et al. |
| 2010/0135365 A1 | 6/2010 | Chen et al. |
| 2011/0090113 A1* | 4/2011 | Fenton .................... G01S 19/54 |
| | | 342/357.36 |
| 2012/0319898 A1* | 12/2012 | Tominaga ............... G01S 19/22 |
| | | 342/357.61 |

FOREIGN PATENT DOCUMENTS

| | | |
|---|---|---|
| EP | 1 717 594 A1 | 11/2006 |
| JP | 62-883 A | 1/1987 |
| JP | 2007-155483 A | 6/2007 |
| WO | 2004/027927 A1 | 4/2004 |

\* cited by examiner

[Fig. 1]
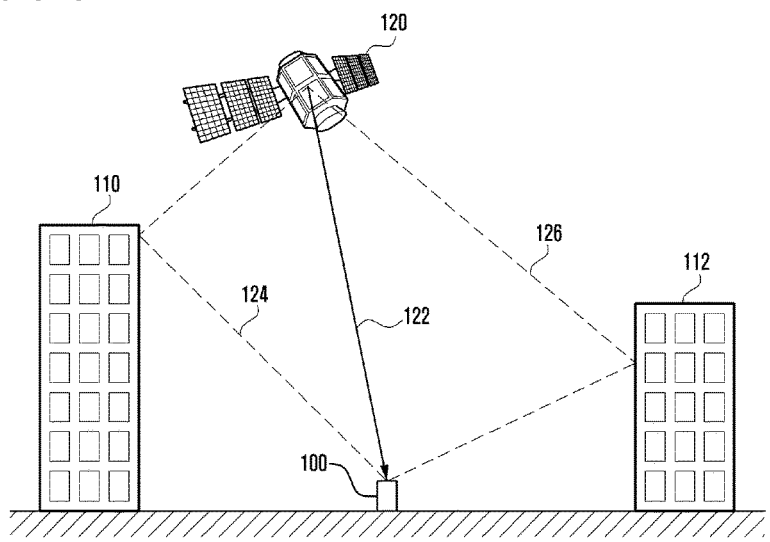
[Fig. 2A]
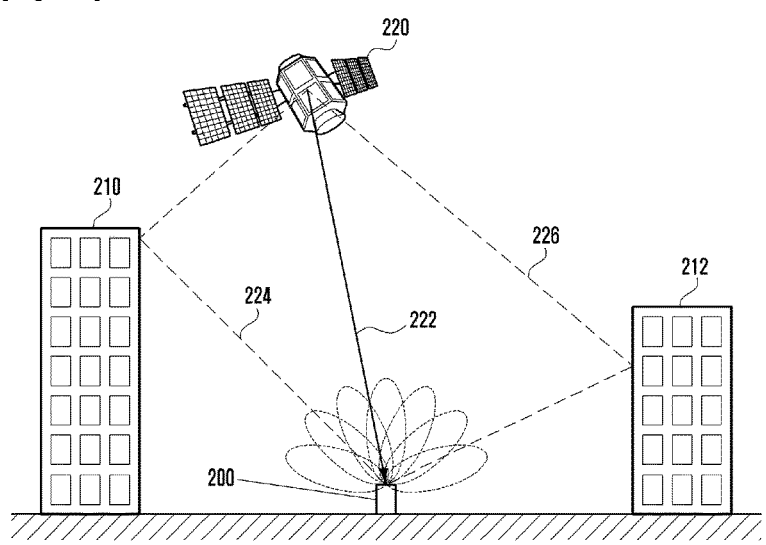
[Fig. 2B]
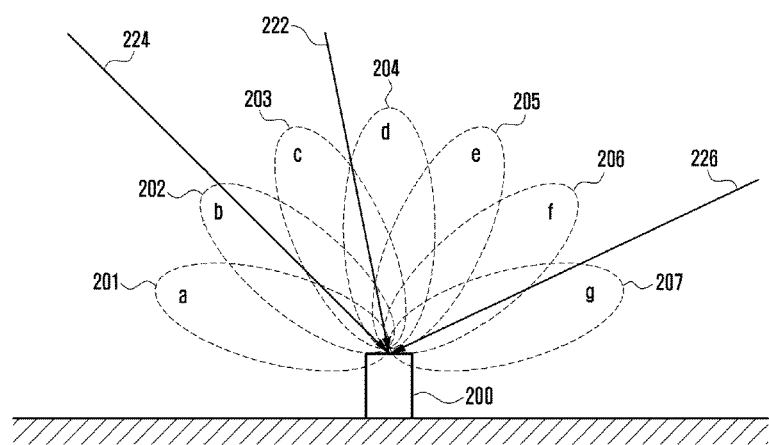

[Fig. 3]
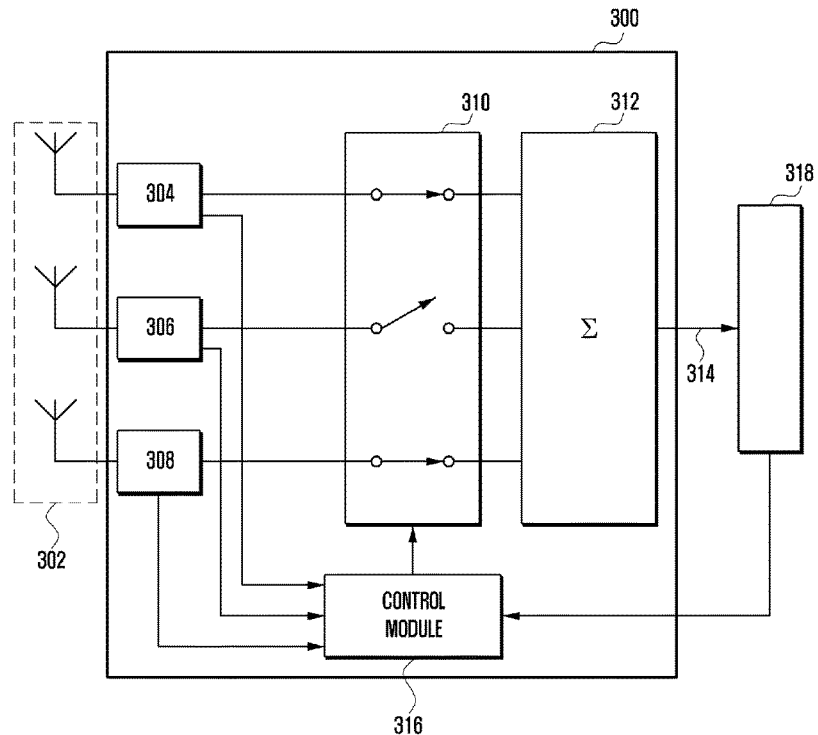
[Fig. 4]
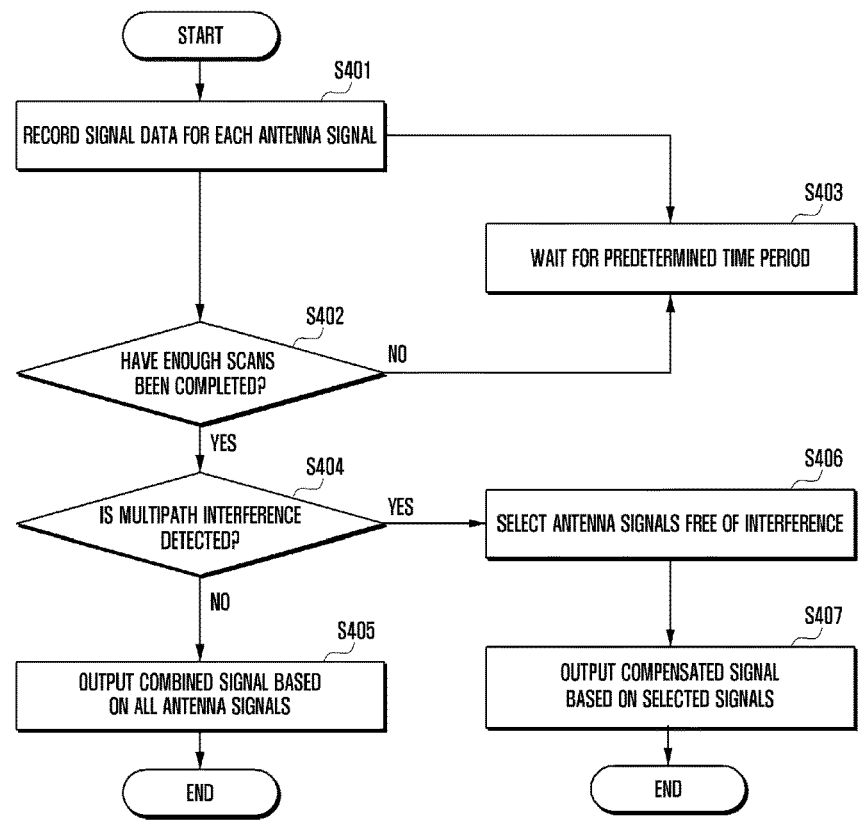

[Fig. 5]
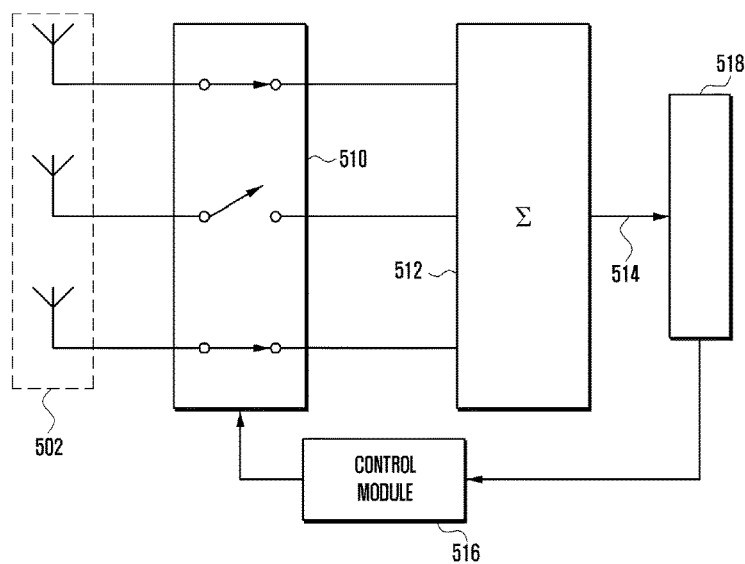
[Fig. 6]
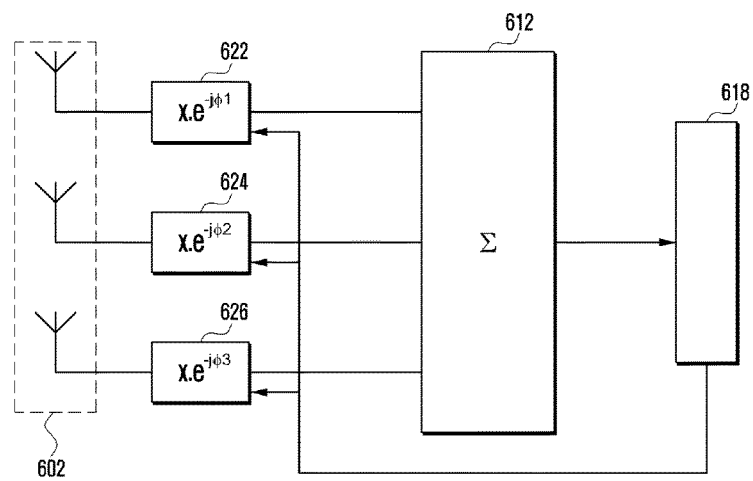
[Fig. 7]
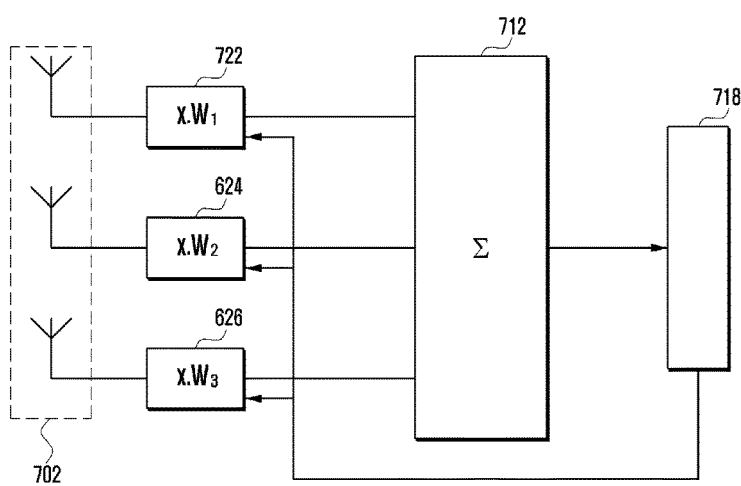

[Fig. 8]
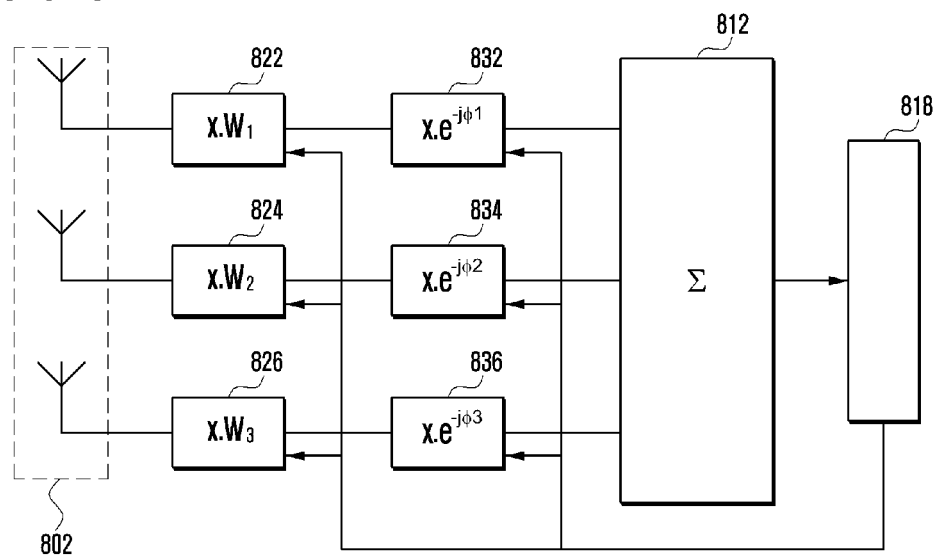
[Fig. 9]
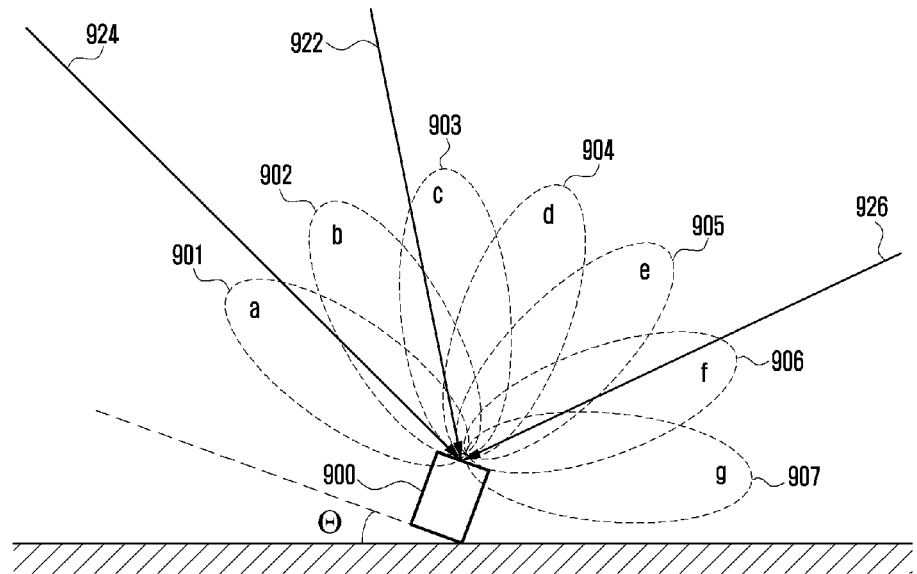

MULTIPATH MITIGATION IN POSITIONING SYSTEMS

TECHNICAL FIELD

The present invention relates to multipath mitigation in positioning systems. More particularly, the present invention relates to a receiver including an antenna configured to output a plurality of antenna signals corresponding to positioning signals received at different angles, a compensate signal being obtained by selecting one or more antenna signals and combining the selected antenna signals.

BACKGROUND ART

Satellite navigation systems are widely-used for determining the location of an earth-based receiver. The receiver calculates a distance, referred to as a "pseudorange", to a satellite, based on a measured time-of-flight of a received signal and a known speed of the signal, i.e. the speed of light. Signals must be received from at least four satellites in order to perform triangulation and calculate a local clock offset at the receiver.

A common source of interference in conventional navigation systems is multipath interference, in which signals are reflected from objects such as buildings before reaching the receiver. Multipath interference is illustrated in FIG. 1, which shows a receiver 100 receiving a direct line-of-sight signal 122 from a satellite 120. The receiver 100 also receives multipath signals 124, 126 which have been reflected off nearby buildings 110, 112. The multipath signals 124, 126 have travelled further than the line-of-sight signal 122, and hence cause the receiver 100 to incorrectly calculate the distance to the satellite 120. Also, because the multipath signals 124, 126 are delayed copies of the line-of-sight signal 122, they can cause interference with the line-of-sight signal 122 at the receiver 100. Multipath effects therefore degrade signal quality and can reduce positioning accuracy.

DISCLOSURE OF INVENTION

Technical Problem

It would be desirable to provide a method and apparatus for multipath mitigation.

Solution to Problem

According to the present invention, there is provided an apparatus for receiving positioning signals from a plurality of sources, the apparatus comprising an antenna for distinguishing between ones of the positioning signals received at different incident angles, the antenna being configured to output a plurality of antenna signals, each antenna signal including ones of the positioning signals received in a predetermined range of incident angles, and a multipath compensation module configured to detect multipath interference, and if multipath interference is detected, to select one or more of the antenna signals and combine the selected one or more antenna signals to obtain a compensated signal.

The multipath compensation module may be configured to control the phase of one or more of the plurality of antenna signals to reduce phase differences between said antenna signals, before obtaining the compensated signal.

For each one of the plurality of antenna signals, the multipath compensation module may be configured to obtain a noise level of the antenna signal for each source in the antenna signal, and control a gain of the antenna signal based on the noise level, before obtaining the compensated signal, wherein a source in the antenna signal is one of the plurality of sources from which positioning signals are currently being received and are included in the antenna signal.

The multipath compensation module may be configured to control the gain of the antenna signal based on the noise level by adjusting the gain to maintain noise in the antenna signal at or below a predetermined power level.

The multipath compensation module may be configured to determine a weighting to be applied to the antenna signal and control the gain of the antenna signal based on the determined weighting, wherein the weighting W may be obtained based on the equation $$W = \frac{SNR_i}{SNR_1},$$

where $SNR_i$ is a current signal-to-noise ratio for positioning signals received from a first source in the antenna signal, and $SNR_1$ is a predetermined reference value of the signal-to-noise ratio for positioning signals received from the first source in the antenna signal.

The multipath compensation module may be configured to control the gain of the antenna signal based on the noise level by adjusting the gain to maintain a signal-to-noise ratio SNR for each source in the compensated signal at or below a predetermined SNR value, wherein a source in the compensated signal is one of the plurality of sources from which positioning signals are currently being received.

If the multipath compensation module is configured to control the phase of one of the selected antenna signals as well as controlling the gain of said one of the selected antenna signals, the multipath compensation module may be configured to apply a gain adjustment to the antenna signal before applying a phase adjustment to the antenna signal.

The multipath compensation module may be configured to select the antenna signals based on the corresponding predetermined range of angles for each antenna signal, by selecting ones of the antenna signals corresponding to incident angles above a predetermined threshold angle to the horizontal.

The multipath compensation module may be configured to determine whether multipath interference is still present in the compensated signal after selecting the antenna signals corresponding to incident angles above the predetermined threshold angle, and if multipath interference is still present in the compensated signal, to increase the predetermined threshold angle and reselect one or more of said antenna signals based on the increased threshold angle.

The multipath compensation module may be configured to repeatedly determine whether multipath interference is still present in the compensated signal and increase the predetermined threshold angle if multipath interference is still present, until multipath interference is no longer present in the compensated signal or until only one of the antenna signals is selected.

The multipath compensation module may be configured to obtain a signal-to-noise ratio SNR for each one of the plurality of antenna signals, and select the antenna signals by selecting antenna signals with a higher SNR in preference to antenna signals with a lower SNR.

If more than one antenna signal includes a positioning signal received from a first one of the plurality of sources, the multipath compensation module may be configured to identify one of the plurality of antenna signals as including a line-of-sight signal received directly from the first source, and output the identified antenna signal as the compensated signal.

The multipath compensation module may be configured to identify the antenna signal including the line-of-sight signal as the one of said more than one antenna signals corresponding to the highest angle to the horizontal, or may be configured to record the time of arrival of each received positioning signal and identify the antenna signal including the line-of-sight signal as the one of said more than one antenna signals having the earliest time of arrival for a positioning signal received from the first source.

The multipath compensation module may be configured to detect multipath interference if two or more positioning signals are received from the same source at different incident angles, within a predetermined time period.

The multipath compensation module may be configured to periodically record, for each antenna signal, information about received positioning signals included in the antenna signal, the information including source information for identifying one or more of the sources from which said positioning signals were received, and time information defining the time at which each of said positioning signals was received, and may be configured to determine whether positioning signals received from the same source have been included in two or more of the antenna signals, based on the recorded information.

The multipath compensation module may be configured to detect multipath interference by obtaining information about the variability of a signal-to-noise ratio SNR of one of the antenna signals, and determine that multipath interference is present in said one of the antenna signals if the variability of the SNR is greater than a threshold level.

The multipath compensating module may be configured to obtain information about a location calculated using the received positioning signals, and detect multipath interference if an accuracy of the calculated location is less than an expected accuracy and/or if the calculated location varies randomly over a predetermined time period.

The multipath compensation module may be configured to determine whether multipath interference is present in each of the antenna signals, and if multipath interference is present in one of the antenna signals, to not select said one of the antenna signals as one of the selected antenna signals.

The apparatus may further comprise a tilt detection module for measuring a current angle of the antenna with respect to the horizontal, wherein the apparatus may be configured to obtain, for each antenna signal, a current angular range for the antenna signal based on the measured current angle of the antenna and the predetermined range of incident angles for the antenna signal.

If the current angular range for one of the antenna signals is below a predetermined minimum angle of elevation, the multipath compensation module may be configured to not select said one of the antenna signals as one of the selected antenna signals.

According to the present invention, there is also provided a method of compensating for multipath interference at an apparatus for receiving a plurality of positioning signals from a plurality of sources, the method comprising receiving the plurality of positioning signals at an antenna arranged to distinguish between ones of the positioning signals received at different incident angles, obtaining a plurality of antenna signals, each antenna signal including ones of the positioning signals received in a predetermined range of incident angles, detecting multipath interference, selecting one or more of the antenna signals if multipath interference is detected, and combining the selected one or more antenna signals to obtain a compensated signal.

The method may further comprise controlling the phase of one or more of the plurality of antenna signals to reduce phase differences between said antenna signals, before combining the selected one or more antenna signals.

The method may further comprise obtaining, for each antenna signal, a noise level of the antenna signal, and controlling a gain of one or more of the antenna signals based on the obtained noise levels, before obtaining the compensated signal.

The gain of each of said one or more antenna signals may be controlled by adjusting the gain to maintain noise in the antenna signal at or below a predetermined power level.

Controlling the gain of one of the antenna signals may comprise determining a weighting to be applied to the antenna signal, and controlling the gain of the antenna signal based on the determined weighting, wherein the weighting W may be obtained based on the equation $$W = \frac{SNR_i}{SNR_1},$$

where $SNR_i$ is a current signal-to-noise ratio for positioning signals received from a first source in the antenna signal, and $SNR_1$ is a predetermined reference value of the signal-to-noise ratio for positioning signals received from the first source in the antenna signal.

The method may further comprise determining whether multipath interference is present in each of the antenna signals, wherein if multipath interference is present in one of the antenna signals, said one of the antenna signals is not selected as one of the selected antenna signals.

According to the present invention, there is further provided a computer-readable storage medium storing a computer program which, when executed on a processor, causes the processor to perform the method.

Advantageous Effects of Invention

According to the present invention, a method and apparatus for multipath mitigation is provided.

BRIEF DESCRIPTION OF DRAWINGS

FIG. 1 illustrates multipath signals in a conventional satellite positioning system;

FIGS. 2A and 2B illustrate a receiver for use in a satellite navigation system, according to an embodiment of the present invention;

FIG. 3 illustrates an apparatus for selectively combining the output of a plurality of antenna lobes to obtain a compensated signal, according to an embodiment of the present invention;

FIG. 4 illustrates a method of detecting multipath interference, according to an embodiment of the present invention;

FIG. 5 illustrates an apparatus for selectively combining the output of a plurality of antenna lobes to obtain a compensated signal, according to an embodiment of the present invention;

FIG. 6 illustrates an apparatus for applying phase corrections to antenna signals prior to obtaining a compensated signal, according to an embodiment of the present invention;

FIG. 7 illustrates an apparatus for applying gain corrections to antenna signals prior to obtaining a compensated signal, according to an embodiment of the present invention;

FIG. 8 illustrates an apparatus for applying gain and phase corrections to antenna signals prior to obtaining a compensated signal, according to an embodiment of the present invention; and FIG. 9 illustrates a receiver configured to detect an orientation of an antenna, according to an embodiment of the present invention.

MODE FOR THE INVENTION

Embodiments of the present invention will now be described, by way of example only, with reference to the accompanying drawings.

Referring now to FIG. 2A, a receiver for use in a satellite navigation system is illustrated, according to an embodiment of the present invention. The receiver 200 is configured to receive positioning signals formatted according to the Global Positioning System (GPS) standard, but in other embodiments a receiver may be configured for use with different navigation systems. The receiver 200 includes an antenna that is configured to have a directionality property, such that the receiver 200 can distinguish between signals received at different incident angles. In the present embodiment, the antenna is a single antenna configured to have a plurality of reception lobes, but in other embodiments an array of directional antennas may be used to provide a similar functionality. In FIG. 2A, the lobes of the antenna are illustrated using dotted lines.

The skilled person will be aware that in a satellite navigation system a receiver should receive positioning signals from a least four satellites in order to calculate the current location. However, to improve clarity, in FIG. 2A only a single satellite is illustrated and remaining satellites in the satellite navigation system are omitted. The receiver 200 receives a direct line-of-sight signal 222 from a satellite 220, and also receives multipath signals 224, 226 that have been reflected from objects 210, 212, for example buildings. As shown in FIG. 2A, the multipath signals 224, 226 are received at different angles to the line-of-sight signal 220. Because the receiver 200 includes an antenna that is configured to distinguish between signals received at different incident angles, the receiver 200 is able to distinguish the line-of-sight signal 220 from the multipath signals 224, 226. Also, in most real-life scenarios, the reflected signals, i.e. multipath signals 224, 226, will be received at a lower angle of elevation than the line-of-sight signal 222. Embodiments of the present invention are able to make use of these properties of multipath signals to improve positioning accuracy in multipath environments, through the use of a directional antenna.

FIG. 2B illustrates the receiver 200 and antenna configuration of FIG. 2 in more detail. In the present embodiment, the antenna is configured to have seven lobes 201, 202, 203, 204, 205, 206, 207 orientated in different directions. In FIG. 2B, the lobes are labelled a to g for ease of reference. Each lobe is arranged to have a "viewing angle" that is restricted to a predetermined angular range, such that incoming signals from the direction of the lobe are received, whilst signals that fall outside of the predetermined angular range are not detected. Directional antennas are known in the art, and as such a detailed description of the antenna is omitted to maintain brevity.

In the example shown in FIG. 2B, the direct line-of-sight signal 222 is received in lobe d 204, and the multipath signals 224, 226 are received in lobes b 202 and g 207. Depending on the particular configuration of the antenna and the angle at which signals are received, one signal may be received by a plurality of lobes at different gains, according to the angle of elevation at which the signal is received. In the scenario illustrated in FIG. 2B, the line-of-sight signal 222 may also be received at a lower gain by lobes b 202, c 203 and e 205. However, a signal output from lobe b 202 will include interference due to one of the multipath signals 224 being received at a high gain in this lobe. The receiver 200 can compensate for these multipath effects by obtaining a compensated signal based on the output of one or more selected lobes, whilst rejecting the output from lobes which are affected by interference from multipath signals. This allows the receiver 200 to substantially remove the interference caused by multipath signals, and obtain an enhanced signal that is compensated for multipath effects by.

FIG. 3 schematically illustrates an apparatus for selectively combining the output of a plurality of antenna lobes to obtain a compensated signal in a receiver, according to an embodiment of the present invention. The apparatus may, for example, be implemented in a receiver such as the one shown in FIGS. 2A and 2B. The apparatus includes an antenna 302 configured to distinguish between signals received at different incident angles. Each signal outputted from the antenna 302 is sent to a multipath compensating module 300, which in the present embodiment includes a plurality of couplers 304, 306, 308, a signal selecting module 310, a signal combining module 312 and a control module 316. The multipath compensating module 300 can detect multipath interference in the antenna signals, select one or more antenna signals using the signal selecting module 310, and combine the selected signals in the signal combining module 312 to obtain a compensated signal 314. The compensated signal can be sent to a processing module 318, which may be similar to a conventional receiver backend processing module, for extracting data from the combined signal and calculated a location of the receiver.

Continuing with reference to FIG. 3, the couplers 304, 306, 308 allow the control module 316 to monitor each antenna signal to determine whether interference is present in each signal. In FIG. 3, the antenna 302 is illustrated as a plurality of sub-antennae, although it is not essential for the antenna to physically comprise a plurality of separate antennae. For example, each sub-antenna shown in FIG. 3 may correspond to a single lobe of an antenna, as shown in FIGS. 2A and 2B. Alternatively, a plurality of directional antennae may be used, in which case each sub-antenna of FIG. 3 may be a physically distinct directional antenna.

The output signals received from the antenna 302, which are hereinafter referred to as antenna signals, are received by the signal selecting module 310. The signal selecting module 310 can independently select each antenna signal to be sent to a signal combining module 312, such that any one antenna signal or any combination of a plurality of antenna signals can be sent to the signal combining module 312. The signal combining module 312 then combines the selected antenna signals into the combined signal 314. In the present embodiment, the signal combining module 312 sums the selected antenna signals to obtain the combined signal 314. However, in other embodiments, the signal combining module 312 may combine the signals using a different method, for example by averaging the selected signals. The combined signal 314 is sent to the processing module 318 for extracting data from the combined signal and calculating a position based on the extracted information. The control module 316 is coupled to the processing module 318 to receive information about the combined signal.

When multipath interference is present in one or more of the antenna signals, the control module 316 can detect the antenna signals that are affected by interference and reject these antenna signals, i.e. switch out the signals so that they are not sent to the signal combining module 312. That is, the control module 316 can control the signal selecting module 310 to select antenna signals that are substantially free of interference, by rejecting the signals in which interference is detected. The selected antenna signals are then combined by the signal combining module 312 to obtain a compensated signal 314 in which multipath interference is substantially removed.

A method of detecting multipath interference is illustrated in FIG. 4. The method is suitable for use in a receiver such as the one shown in FIG. 3, in which a plurality of antenna signals are outputted by an antenna, each antenna signal corresponding to positioning signals received in a predetermined range of incident angles. The method can be executed by the control module 316 of FIG. 3 to determine whether multipath interference is present in any of the antenna signals, and select antenna signals to be combined into a compensated signal.

Firstly, in step S401 the control module performs a scan in which signal data is recorded for each antenna signal. In different embodiments, different types of signal data can be recorded when checking for multipath interference. For example, in the present embodiment the control module records, for each antenna signal, source information about any satellites currently visible in the lobe from which the antenna signal is outputted. That is, at any point in time, each antenna signal may include a plurality of positioning signals received from a plurality of different satellites. The source information may include the associated satellite identifiers IDs and pseudorandom number PRN codes for each satellite currently visible in that lobe.

In addition, signal-to-noise ratio SNR information is also recorded for each source currently present in the antenna signal. Specifically, for each source identified in the source information, a signal-to-noise ratio of the positioning signal received from that source is recorded. Finally, for each data/code observed in the antenna signal during the scan, time information is recorded for identifying a time at which the code was received.

Next, in step S402, it is checked whether a sufficient number of scans have been completed. A predetermined number of scans may be required in order to detect multipath interference. In the present embodiment, a total of four scans are required, but in other embodiments any number may be chosen. If an insufficient number of scans have been recorded, there is not enough information yet to search for multipath interference, and so the control module waits for a predetermined time period in step S403 before again scanning the antenna signals and recording the signal data. In some embodiments step S403 may be omitted, and the next scan may begin immediately.

Additionally, in step S401 it is possible that a full set of data may already exist from a previous set of scans. In particular, this may occur when the method is continually executed at the receiver to constantly check for multipath interference. In this case, the control module may check whether the existing data set was collected sufficiently recently to still be relevant. If so, the oldest set of scan data may be deleted, and replaced with new signal data collected during the current scan in step S401. In this case, it may only be necessary to perform a single scan before moving on to step S404 to detect multipath interference, because existing data from previous scans can be reused. On the other hand, if the existing data was recorded longer than a predetermined time ago, the control module may determine that the existing data is out-of-date and should be deleted. In this case, the predetermined number of scans will all have to be completed before the process can continue.

Once the predetermined number of scans have been completed, the control module proceeds to step S404 and analyses the recorded signal data across all scans to determine whether multipath interference is present. Specifically, the signal data for each antenna signal is analysed to determine whether multipath interference is present in that antenna signal. Various methods of detecting multipath interference may be used. For example, for a particular antenna signal, the SNR for signals received from the same source, e.g. satellite, may typically vary by a few decibels (dB) between scans. However, if the SNR for signals received from a particular satellite varies by a large amount between scans, i.e. more than a predetermined threshold amount, the control module may determine that multipath interference is present in this antenna signal.

Another indication of multipath interference may be if signals from the same source are recorded in more than one antenna signal during the predetermined number of scans. If the angular ranges of the antenna signals do not significantly overlap, it may be assumed that the presence of signals from the same source in different antenna signals is an indicator of multipath interference. Alternatively, if there is substantial overlap between the angular ranges covered by different antenna signals, as shown in FIG. 2B, the time information for each received signal may be examined to detect a multipath effect. In particular, when signals from the same source are present in a plurality of antenna signals, the control module may compare the time information for signals including the same data or code from different antenna signals. The antenna signal or signals having the earliest recorded time-of-arrival corresponds to the direct line-of-sight signal, and any antenna signals having a later time-of-arrival for the same data or code from the same source are determined to include a multipath signal, i.e. a delayed copy of the line-of-sight signal.

After searching for multipath interference in the antenna signals in step S404, it is possible that no interference was detected. For example, in some embodiments the method of FIG. 4 may be executed continuously by a receiver, to ensure that multipath interference is detected as soon as it occurs. In this case, if no multipath signals are currently present, then at step S404 no multipath interference will be detected. In this case, the control module proceeds to step S405 and outputs a combined signal based on all antenna signals.

However, if multipath interference is detected in one or more antenna signals at step S404, then the control module proceeds to step S405 and selects those antenna signals which are free of interference. Referring to the embodiment in FIG. 3, the signal selecting module 310 can be controlled to switch out those antenna signals in which multipath signals were detected at step S404. The remaining antenna signals are those which were determined to be free from multipath interference at step S404, and these are selected in step S406 to be combined into the compensated signal in step S407. As stated above, the selected signals may, for example, be combined by summing the selected signals, or by averaging the selected signals.

A method such as the one shown in FIG. 4 can be used by a receiver to identify the existence of multipath interference in one or more lobes of an antenna such as the one shown in FIG. 2B. If multipath interference is detected in any lobe, the antenna signal corresponding to that lobe can be rejected when selecting antenna signals to be combined into a compensated signal. Therefore, only those antenna signals which are substantially free of interference are used to obtain the compensated signal, and hence the receiver can accurately calculate its location even in environments where multipath signals are being received.

The method of FIG. 4 may be executed continuously, to constantly detect and correct for any multipath interference as and when it arises. Alternatively, the method may only be executed once multipath interference has already been identified by another method, for example if a sudden change in calculated location coordinates is observed which may indicate multipath interference. In this case, multipath interference should always be detected at step S404.

Although in the method of FIG. 4, multipath interference is detected at step S404, in other embodiments of the present invention the signal data may be analysed to search more generally for any interference, i.e. not only interference from multipath signals. For example, the SNR data for positioning signals from a particular satellite in a particular antenna signal may indicate whether a source of noise is present in the angular range covered by the antenna signal. The noise source could be any source of radiation having the same, or similar, frequency to the received positioning signals. In this case, if a noise source is present in the angular range covered by a particular antenna signal, the measured SNR for the satellite in that antenna signal will be degraded. In general, a predetermined minimum SNR value may be set during calibration and testing of the receiver, and if the SNR recorded during a scan for an antenna signal is below the predetermined minimum value, it may be determined that a source of noise is present for that antenna signal.

Here, if noise is detected in the antenna signal, the antenna signal may automatically be switched out in step S406, i.e. not selected to be used when obtaining the compensated signal. Alternatively, in some embodiments, a further check may be carried out once a noise source is identified in an antenna signal before determining whether or not to reject that signal. Specifically, if a low SNR value, i.e. a value below the predetermined minimum SNR value, is detected in one scan, the SNR value for remaining scans of the same antenna signal may be compared. If the low SNR value only occurs in one scan, it may be determined that the interference was a one-off occurrence, and the antenna signal may still be selected in step S406 for obtaining the compensated signal. If all recorded scans show the low SNR value for the antenna signal, it may be determined that a persistent noise source is present, and that antenna signal should be rejected, i.e. switched out, when selecting signals in step S406. A third possibility is that the low SNR value occurs in more than one scan but not in all scans for the antenna signal, i.e. the interference is intermittent. Here, the recorded time information may be used in determining whether or not to reject the signal. For example, if the time information shows that the interference is not currently occurring, e.g. did not occur in the most recent scan, the antenna signal may still be selected in step S406 and used when obtaining the compensated signal in step S407. If it is determined that the interference is currently occurring, the antenna signal may not be selected at step S406.

In a method such as the one shown in FIG. 4, it is necessary to separately monitor each antenna signal in order to obtain the signal data. In the embodiment shown in FIG. 3, the control module 316 is separately coupled to a plurality of couplers 304, 306, 308 for monitoring each antenna signal. The couplers 304, 306, 308 are configured to couple off a portion of the signal, to be sent to the control module 316. The control module 316 may therefore monitor the antenna signals simultaneously, i.e. in parallel, and extract data from each antenna signal separately for recording the signal data. However, the present invention is not limited to this embodiment, and other arrangements are possible.

An example of an alternative arrangement is shown in FIG. 5. Here, the apparatus includes an antenna 502, signal selecting module 510 and signal combining module 512 similar to the corresponding elements of FIG. 3. However, in the present embodiment a control module 516 does not simultaneously monitor all antenna signals. Instead, to record signal data for one antenna signal, the control module 516 controls the signal selecting module 510 to switch out all other antenna signals, so that only the antenna signal of interest is sent to the signal combining module 512. At this point, the signal 514 output by the signal combining module 512 corresponds directly to the selected antenna signal, since only one antenna signal is selected. This signal 514 is then sent to the processing module 518, which extracts data such as satellite ID and PRN codes from the combined signal. The extracted data is sent to the control module 516, along with any other required information such as a SNR of the signal. The control module 516 records the signal data and then repeats the process for the subsequent antenna signals, controlling the signal selecting module 510 to select each antenna signal in turn whilst signal data is recorded. This arrangement removes the need for the separate couplers of FIG. 3, but will be slower because antenna signals must be processed sequentially rather than simultaneously.

For combining the selected antenna signals after those signals with interference have been rejected, various approaches are possible, and alternative embodiments will now be described with reference to FIGS. 6 to 9.

Referring now to FIG. 6, an apparatus for applying phase corrections to antenna signals prior to obtaining a compensated signal is illustrated, according to an embodiment of the present invention. The apparatus comprises an antenna 602, signal combining module 612 and processing module 618 which may be substantially similar to the corresponding elements described above with reference to FIGS. 3 and 5. A control module and signal selecting module such as those shown in FIGS. 3 and 5 may also be included, but are omitted here for clarity.

In the present embodiment, the receiver is configured to apply phase corrections to each antenna signal, prior to combining the signals in the signal combining module 612. The phase corrections are applied via a plurality of phase control modules 622, 624, 626, which may be coupled before or after a signal selecting module similar to the one shown in FIG. 3.

In more detail, the antenna signals will be complex signals with real and imaginary components. Before reaching the multipath compensation module, each antenna signal will undergo a phase shift $\phi n$ according to the particular antenna response, board layout and antenna coupling. That is, the output A1 of the $n_{th}$ antenna will be phase-shifted by $\phi n$, such that the antenna signal as it reaches the multipath compensation module will be given by:

$$A_n e^{j\phi n}$$

The phase shift may differ between antenna signals, such that different antenna signals may not be coherent with one another. If, for example, two antenna signals are anti-phase, the combined output will suffer severe fading. In the present embodiment, this is avoided by applying the phase corrections before combining the signals, to ensure that all antenna signals are substantially in-phase with one another before combining. In the case of the $n_{th}$ antenna shown above, the phase shift is compensated by controlling the $n_{th}$ phase control module to apply the phase correction:

$$xe^{-j\phi n}$$

where x is the signal received by the $n_{th}$ phase control module. Appropriate phase corrections can be determined by measuring the phase of each antenna signal relative to one antenna signal whose gain is held fixed, as a reference signal.

By applying phase corrections to ensure that all signals are in phase, the embodiment of FIG. 6 can combine all antenna signals, and therefore make use of all received signal power. The phase-correction embodiment of FIG. 6 can also be combined with the signal selection embodiments of FIGS. 3 and 5, to reject antenna signals suffering from interference before combining the remaining signals.

Referring now to FIG. 7, an apparatus for applying gain corrections to antenna signals prior to obtaining a compensated signal is illustrated, according to an embodiment of the present invention. The apparatus comprises an antenna 702, signal combining module 712 and processing module 718 which may be substantially similar to the corresponding elements described above with reference to FIGS. 3 and 5. A control module and signal selecting module such as those shown in FIGS. 3 and 5 may also be included, but are omitted here for clarity.

In the present embodiment, the receiver is configured to apply gain corrections to each antenna signal, prior to combining the signals in the signal combining module 712. The gain corrections are applied via a plurality of gain control modules 722, 724, 726, which may be coupled before or after a signal selecting module similar to the one shown in FIG. 3.

In more detail, it is possible that not all antenna signals may have the same SNR. If the SNR varies significantly from one antenna signal to the next, the overall SNR of the combined signal may be degraded. Here, an overall SNR of the combined signal is determined for each source, i.e. each visible satellite. In the present embodiment, if the SNR of an antenna signal is substantially lower than that of other antenna signals, the gain of the antenna signal with the lower SNR is reduced in order to optimise the overall SNR of the combined signal for a particular satellite. The gain reduction applied depends on the severity of the SNR degradation. The gain correction will not affect the SNR of the particular antenna signal to which the gain correction is applied, as both the wanted signal power and noise power will be reduced by the same proportion. Nevertheless, the gain corrections can be used to maintain the SNR of the combined signal within a predetermined range for signals received from a particular satellite.

In more detail, the total power of the $n_{th}$ antenna signal can be expressed as:

$$A_n + P_n$$

where $A_n$ is the wanted signal power, and $P_n$ is the noise power. The total wanted power $A_{all}$ of a combined signal obtained by summing the n antenna signals can be expressed as:

$$A_{all} = A_1 + A_2 + \ldots A_n$$

and the total noise power $P_{all}$ of the combined signal can be expressed as:

$$P_{all} = P_1 + P_2 + \ldots P_n$$

The SNR of the combined signal, $SNR_{all}$, is therefore given by:

$$SNR_{all} = (A_1 + A_2 + \ldots A_n)/(P_1 + P_2 + \ldots P_n)$$

This can be expanded to:

$$SNR_{all} = \{A_1/(P_1 + P_2 + \ldots P_n)\} + \ldots \{A_n/(P_1 + P_2 + \ldots P_n)\}$$

Therefore the contribution of each antenna signal to the SNR for a particular satellite depends on the wanted signal power of the antenna signal, as well as the noise power from all antenna signals. The SNR of the combined signal will therefore be degraded if the noise on one antenna signal increases. The gain corrections may be continually applied to maintain the noise contribution on each antenna signal to a constant value. The constant value may be predetermined, and can be set during calibration to correspond to an expected noise level on the channel when no interference is present.

In more detail, a weighting $W_n$ to be applied as the gain correction to the $n^{th}$ antenna signal can be expressed as:

$$W_n(P_n + \Delta P) = P_n$$

where $P_n$ is the noise power without interference, and $\Delta P$ is the additional noise power introduced by the interference. This can be rearranged to:

$$W_n = SNR_i/SNR_0$$

where $SNR_i$ is the SNR of the antenna signal with interference, and $SNR_0$ is the SNR of the antenna signal without interference.

By applying gain corrections in this way, it is possible to maintain the noise contribution of each antenna signal at a constant level. The wanted signal power from the antenna signal will be reduced by applying the weighting W, but because the noise contribution of the antenna signal is held constant, the degradation of the overall SNR of the combined signal for a particular satellite can be minimised. The present embodiment can therefore allow a plurality of antenna signals to be combined even when the noise on one or more antenna signals increases, without significantly degrading the SNR of the combined signal. Additionally, because all antenna signals can be combined in this way, none of the received signal power is wasted. That is, the total wanted signal power in the combined signal can be maximised.

The present invention is not limited to the method of determining gain corrections described above. In other embodiments, other approaches may be used. For example, an alternative method of determining gain corrections to be applied is to select the antenna signal with the highest noise level, and reduce the weighting factor applied to the antenna signal whilst monitoring the SNR of the combined signal. The weighting factor, i.e. the gain, is continually reduced until the SNR of the combined signal plateaus, i.e. reaches a constant level such that further reductions in the gain of the antenna signal do not affect the combined SNR. Another alternative method is to set a predetermined minimum limit for the combined SNR for signals received from one of the satellites. If the combined SNR for the satellite falls below the predetermined limit, a gain correction can be applied to one or more antenna signals which have the lowest SNR, to recover the overall SNR above the minimum limit.

Referring now to FIG. 8, an apparatus for applying both gain and phase corrections to antenna signals prior to obtaining a compensated signal is illustrated, according to an embodiment of the present invention. The apparatus comprises an antenna 802, signal combining module 812 and processing module 818 which may be substantially similar to the corresponding elements described above with reference to FIGS. 3 and 5. A control module and signal selecting module such as those shown in FIGS. 3 and 5 may also be included, but are omitted here for clarity.

In the present embodiment, the receiver is configured to apply gain corrections to each antenna signal, prior to combining the signals in the signal combining module 812. The gain and phase corrections may be determined as described above with reference to FIGS. 6 and 7, and are applied via a plurality of gain control modules 822, 824, 826 and a plurality of phase control modules 832, 834, 836. In general, the gain and phase corrections may be applied in any order to an antenna signal. Preferably though, as in the present embodiment, the gain correction is applied before applying the phase correction. This ensures that any phase changes introduced by the gain control modules 822, 824, 826 are taken into account when subsequently applying the phase corrections. Applying both gain and phase corrections, as shown in FIG. 8, ensures that the antenna signals are maintained in phase when combining, allowing the combined signal level to be maximised, whilst also optimising the overall SNR for the satellite by controlling the impact of interference on one antenna signal on the overall SNR.

Referring now to FIG. 9, a receiver configured to detect an orientation of an antenna is illustrated, according to an embodiment of the present invention. The receiver 900 may be substantially similar to the receiver of FIG. 2B, and includes an antenna configured to have a plurality of reception lobes 901, 902, 903, 904, 905, 906, 907 labelled a to g. In the scenario shown in FIG. 9, the receiver 900 receives a direct line-of-sight signal 922, and multipath signals 924, 926, similar to the signals shown in FIG. 2B. In the present embodiment, the receiver 900 also includes an orientation detection module configured to detect an orientation of the antenna, specifically an angle of inclination $\Theta$ with respect to the horizontal and a direction in which the receiver 900 is inclined. For example, the orientation detection module may be a gyroscope. A two-dimensional gyroscope is sufficient for this purpose, since rotation within the horizontal plane will not affect an angle of each lobe to the horizontal.

As shown in FIG. 9, when the receiver 900 is inclined, for example when a user holds the receiver 900 at an angle to view a display more easily, it is possible that certain lobes of the antenna may be rotated to very low angles of elevation, potentially below the horizontal. A predetermined minimum angle of elevation may be set, and the receiver 900 may continually or periodically measure the angle at which the antenna is inclined and adjust the known angle of each lobe accordingly, to calculate a true angle of the lobe. If the true angle of a lobe falls below the minimum angle, the antenna signal from that lobe may be automatically disregarded since it can be assumed that in this orientation the lobe will only be able to receive multipath signals. For example, if the normal angle, i.e. the angle when the receiver is horizontal, of lobe g 907 is 15°, and the receiver is rotated by an angle $\Theta$ of 20°, the true angle of lobe g 907 is calculated as −5°. If the minimum predetermined angle is 10°, then the receiver 900 determines that the true angle of lobe g 907 is below the minimum angle, and so automatically disregards the antenna signal output from lobe g 907.

Embodiments of the present invention have been described in which antenna signals including interference are rejected and all remaining signals selected to be combined into a compensated signal. However, in some embodiments a further selection step may be included before obtaining the compensated signal. That is, in addition to switching out those antenna signals in which multipath interference has been detected, a receiver may then select certain ones of the remaining, i.e. interference-free, signals to be combined. For example, in one embodiment, antenna signals having the highest SNR are selected from the remaining antenna signals. Here, if all remaining antenna signals have identical SNR values, the antenna signal with the highest signal output may be selected and output as the compensated signal. Alternatively, all high SNR antennae signals can be combined to produce a stronger signal.

Also, embodiments of the present invention have been described in which a receiver scans the antenna signals output by a plurality of lobes of an antenna to determine whether multipath interference is present in any of the antenna signals. However, the present invention is not limited to this method of detecting multipath effects. In some embodiments, multipath interference may be detected by analysing properties of the combined signal obtained by combining the plurality of antenna signals, instead of separately analysing each individual antenna signal.

As an example, the receiver may be configured to measure and record the SNR of the combined signal over a predetermined time period. If the total variation in SNR during the predetermined time period exceeds a threshold amount, or if the rate of change of SNR exceeds a threshold level, it can be assumed that the fluctuations in SNR are due to multipath effects. Alternatively, the receiver can monitor positioning parameters calculated using the antenna signals over a predetermined time period. For example, if the location coordinate accuracy is degraded, and/or if calculated coordinates vary by more than a predetermined amount or drift randomly over time, it can be assumed that multipath effects are present, and accordingly the receiver may select one or more of the antenna signals and combine the selected signals to obtain a compensated signal.

Although embodiments of the present invention have been described in which antenna signals are selected by rejecting those signals in which interference is detected, the present invention is not limited to this method of selecting signals. In some embodiments, antenna signals may be selected without analysing each antenna signal separately. For example, interference may be detected in the combined signal using one of the methods described above, such as SNR or coordinate analysis. As a first step to remove multipath interference from a combined signal, a receiver may reject antenna signals from lobes whose angular ranges are below a predetermined threshold angle to the horizontal. This method makes use of the fact that multipath signals are typically received at lower angles than a direct line-of-sight signal, as shown in FIG. 2A. The combined signal can then again be evaluated to determine whether multipath interference has been removed. If the interference is still present, the threshold angle can be increased, and additional antenna signals rejected accordingly. This process can be repeated until multipath interference is no longer present in the combined signal, or until only a single antenna signal is selected. In such embodiments, the receiver may preferably include means for measuring an orientation of the antenna, as described above with respect to FIG. 9, such that the orientation can be taken into account when determining which antenna signals to reject.

Furthermore, embodiments of the present invention have been described in relation to a global navigation satellite system (GNSS), such as GPS. However, the present invention is not limited to use in GNSS receivers, and embodiments of the present invention may also be used in positioning systems in which signals are received from sources other than satellites. For example, a receiver may be configured to receive WiFi, Basestation, or eloran signals from a plurality of sources, and may detect and compensate for multipath effects in a similar manner to any of the above-described embodiments.

Whilst certain embodiments of the invention have been described above, it will be clear to the skilled person that many variations and modifications are possible without departing from the scope of the invention as defined in the accompanying claims.

The invention claimed is:

1. An apparatus for receiving positioning signals from a plurality of sources, the apparatus comprising:
an antenna for distinguishing between ones of the positioning signals received at different incident angles, the antenna being configured to output a plurality of antenna signals, each antenna signal including ones of the positioning signals received in a predetermined range of incident angles; and
a multipath compensation module configured to detect multipath interference, and if multipath interference is detected, to select one or more of the antenna signals and combine the selected one or more antenna signals to obtain a compensated signal,
wherein for each of the plurality of antenna signals, the multipath compensation module is further configured to obtain a noise level of the antenna signal for each source in the antenna signal, and control a gain of the antenna signal based on the noise level by adjusting the gain to maintain noise in the antenna signal at or below a predetermined power level, before obtaining the compensated signal.

2. The apparatus of claim 1, wherein the multipath compensation module is configured to control the phase of one or more of the plurality of antenna signals to reduce phase differences between said antenna signals, before obtaining the compensated signal.

3. The apparatus of claim 1,
wherein a source in the antenna signal is one of the plurality of sources from which positioning signals are currently being received and are included in the antenna signal.

4. The apparatus of claim 1, wherein the multipath compensation module is configured to determine a weighting to be applied to the antenna signal and control the gain of the antenna signal based on the determined weighting, wherein the weighting W is obtained based on the equation $$W = \frac{SNR_i}{SNR_1},$$

where $SNR_i$ is a current signal-to-noise ratio (SNR) for positioning signals received from a first source in the antenna signal, and $SNR_1$ is a predetermined reference value of the signal-to-noise ratio positioning signals received from the first source in the antenna signal.

5. The apparatus of claim 1, wherein the multipath compensation module is configured to control the gain of the antenna signal based on the noise level by adjusting the gain to maintain a signal-to-noise ratio (SNR) for each source in the compensated signal at or below a predetermined SNR value,
wherein a source in the compensated signal is one of the plurality of sources from which positioning signals are currently being received.

6. The apparatus of claim 1, wherein if the multipath compensation module is configured to control the phase of one of the selected antenna signals as well as controlling the gain of said one of the selected antenna signals, the multipath compensation module is configured to apply a gain adjustment to the antenna signal before applying a phase adjustment to the antenna signal.

7. The apparatus of claim 1, wherein the multipath compensation module is configured to select the antenna signals based on the corresponding predetermined range of angles for each antenna signal, by selecting ones of the antenna signals corresponding to incident angles above a predetermined threshold angle to the horizontal.

8. The apparatus of claim 7, wherein the multipath compensation module is configured to determine whether multipath interference is still present in the compensated signal after selecting the antenna signals corresponding to incident angles above the predetermined threshold angle, and if multipath interference is still present in the compensated signal, to increase the predetermined threshold angle and reselect one or more of said antenna signals based on the increased threshold angle.

9. The apparatus of claim 8, wherein the multipath compensation module is configured to repeatedly determine whether multipath interference is still present in the compensated signal and increase the predetermined threshold angle if multipath interference is still present, until multipath interference is no longer present in the compensated signal or until only one of the antenna signals is selected.

10. The apparatus of claim 1, wherein the multipath compensation module is configured to obtain a signal-to-noise ratio (SNR) for each source in each one of the plurality of antenna signals, and select the antenna signals by selecting antenna signals with a higher SNR in preference to antenna signals with a lower SNR.

11. The apparatus of claim 1, wherein if more than one antenna signal includes a positioning signal received from a first one of the plurality of sources, the multipath compensation module is configured to identify one of the plurality of antenna signals as including a line-of-sight signal received directly from the first source, and output the identified antenna signal as the compensated signal.

12. The apparatus of claim 11, wherein the multipath compensation module is configured to identify the antenna signal including the line-of-sight signal as the one of said more than one antenna signals corresponding to the highest angle to the horizontal, or
wherein the multipath compensation module is configured to record the time of arrival of each received positioning signal, and identify the antenna signal including the line-of-sight signal as the one of said more than one antenna signals having the earliest time of arrival for a positioning signal received from the first source.

13. The apparatus of claim 1, wherein the multipath compensation module is configured to detect multipath interference if two or more positioning signals are received from the same source at different incident angles, within a predetermined time period.

14. The apparatus of claim 13, wherein the multipath compensation module is configured to periodically record, for each antenna signal, information about received positioning signals included in the antenna signal, the information including source information for identifying one or more of the sources from which said positioning signals were received, and time information defining the time at which each of said positioning signals was received, and
wherein the multipath compensation module is configured to determine whether positioning signals received from the same source have been included in two or more of the antenna signals, based on the recorded information.

15. The apparatus of claim 1, wherein the multipath compensation module is configured to detect multipath interference by obtaining information about the variability of a signal-to-noise ratio (SNR) of one of the antenna signals, and determine that multipath interference is present in said one of the antenna signals if the variability of the SNR is greater than a threshold level.

16. The apparatus of claim 1, wherein the multipath compensating module is configured to obtain information about a calculated location using the received positioning signals, and detect multipath interference if an accuracy of the calculated location is less than an expected accuracy and/or if the calculated location varies randomly over a predetermined time period.

17. The apparatus of claim 1, wherein the multipath compensation module is configured to determine whether multipath interference is present in each of the antenna signals, and
wherein if multipath interference is present in one of the antenna signals, the multipath compensation module is configured to not select said one of the antenna signals as one of the selected antenna signals.

18. The apparatus of claim 1, further comprising:
a tilt detection module configured to measure a current angle of the antenna with respect to the horizontal,
wherein the apparatus is configured to obtain, for each antenna signal, a current angular range for the antenna signal based on the measured current angle of the antenna and the predetermined range of incident angles for the antenna signal.

19. The apparatus of claim 18, wherein if the current angular range for one of the antenna signals is below a predetermined minimum angle of elevation, the multipath compensation module is configured to not select said one of the antenna signals as one of the selected antenna signals.

20. A method of compensating for multipath interference at an apparatus for receiving a plurality of positioning signals from a plurality of sources, the method comprising:
receiving the plurality of positioning signals at an antenna arranged to distinguish between ones of the positioning signals received at different incident angles;
obtaining a plurality of antenna signals, each antenna signal including ones of the positioning signals received in a predetermined range of incident angles;
detecting multipath interference;
selecting one or more of the antenna signals if multipath interference is detected;
combining the selected one or more antenna signals to obtain a compensated signal; and
before obtaining the compensated signal, obtaining, for each of the plurality of antenna signals, a noise level of the antenna signal for each source in the antenna signal and controlling a gain of the antenna signals based on the noise levels by adjusting the gain to maintain noise in the antenna signal at or below a predetermined power level.

21. The method of claim 20, further comprising:
controlling the phase of one or more of the plurality of antenna signals to reduce phase differences between said antenna signals, before combining the selected one or more antenna signals.

22. The method of claim 21, wherein controlling the gain of one of the antenna signals comprises:
determining a weighting to be applied to the antenna signal; and
controlling the gain of the antenna signal based on the determined weighting, wherein the weighting W is obtained based on the equation $$W = \frac{SNR_i}{SNR_1},$$

where $SNR_i$ is a current signal-to-noise ratio (SNR) for positioning signals received from a first source in the antenna signal, and $SNR_1$ is a predetermined reference value of the signal-to-noise ratio for positioning signals received from the first source in the antenna signal.

23. The method of claim 20, further comprising:
determining whether multipath interference is present in each of the antenna signals,
wherein if multipath interference is present in one of the antenna signals, said one of the antenna signals is not selected as one of the selected antenna signals.

24. A computer-readable storage medium storing a computer program which, when executed on a processor, causes the processor to perform the method according to claim 20.

* * * * *